United States Patent
Al-kadi et al.

(10) Patent No.: US 12,130,373 B2
(45) Date of Patent: Oct. 29, 2024

(54) METHOD, SYSTEM, AND DEVICE FOR WIRELESS LOCALIZATION

(71) Applicant: NXP B.V., Eindhoven (NL)

(72) Inventors: Ghiath Al-kadi, Graz (AT); Stefan Lemsitzer, Stainz (AT)

(73) Assignee: NXP B.V., Eindhoven (NL)

( * ) Notice: Subject to any disclaimer, the term of this patent is extended or adjusted under 35 U.S.C. 154(b) by 443 days.

(21) Appl. No.: 17/728,866

(22) Filed: Apr. 25, 2022

(65) Prior Publication Data

US 2023/0341506 A1   Oct. 26, 2023

(51) Int. Cl.
*H04W 64/00* (2009.01)
*G01S 5/06* (2006.01)
*G01S 5/10* (2006.01)
*G01S 5/14* (2006.01)

(52) U.S. Cl.
CPC ............ *G01S 5/145* (2013.01); *G01S 5/06* (2013.01); *G01S 5/10* (2013.01); *H04W 64/006* (2013.01)

(58) Field of Classification Search
CPC .................... H04W 64/003; H04W 64/00
See application file for complete search history.

(56) References Cited

U.S. PATENT DOCUMENTS

| | | | |
|---|---|---|---|
| 2022/0065979 A1 | 3/2022 | Bao et al. | |
| 2022/0066010 A1* | 3/2022 | Henry | G01S 5/145 |
| 2022/0381871 A1* | 12/2022 | Raza | H04L 5/005 |

FOREIGN PATENT DOCUMENTS

| | | |
|---|---|---|
| WO | 2021171723 A1 | 9/2021 |
| WO | 2022065945 A1 | 3/2022 |

OTHER PUBLICATIONS

Kolakowski, Marcin et al. "TDOA-TWR based positioning algorithm for UWB localization system", IEEE, (2016), 4 pgs.
Mazraani, Rami et al. "Experimental Results of a Combined TDOA/TOF Technique for UWB Based Localization Systems", IEEE, (2017), 6 pgs.
Wei, Zihui et al. "Joint positioning technique based on TOF and TDOA", IEEE, (2018), 6 pgs.
Wang, Tan et al. "A Hybrid Localization Algorithm Based on TOF and TDOA for Asynchronous Wireless Sensor Networks", IEEE Access, vol. 7, (2019), pp. 158981-158988.
Choi, Bongyong et al. "UWB TDOA/TOA measurement system with wireless time synchronization and simultaneous tag and anchor positioning", IEEE, (2018), 6 pgs.

* cited by examiner

Primary Examiner — Kevin Kim

(57) ABSTRACT

A method, a system, and a device for wireless localization are disclosed. In an embodiment, the method includes performing, by a localization device, Two-Way Ranging (TWR) and Time Difference of Arrival (TDOA) in parallel, where the TWR is performed with a receiving device to determine a distance between the localization device and the receiving device, and the TDOA is performed with anchors to determine a geolocation of the localization device, and determining, using the distance and the geolocation, a position of the localization device relative to the receiving device.

20 Claims, 6 Drawing Sheets

METHOD, SYSTEM, AND DEVICE FOR WIRELESS LOCALIZATION

BACKGROUND

In wireless localization, devices can transmit and receive information related to distance to determine a position of one device relative to another device. For example, a receiving device (e.g., an access gate) may perform ranging with a localization device (e.g., a user device) to determine the position of the localization device relative to the receiving device. However, ranging is often inaccurate in environments where reflections, multipath scenarios, and/or multiple localization devices are present. As such, conventional wireless localization techniques lack reliability and operability.

SUMMARY

A method, a system, and a device for wireless localization are disclosed. In an embodiment, the method includes performing, by a localization device, Two-Way Ranging (TWR) and Time Difference of Arrival (TDOA) in parallel, where the TWR is performed with a receiving device to determine a distance between the localization device and the receiving device, and the TDOA is performed with anchors to determine a geolocation of the localization device, and determining, using the distance and the geolocation, a position of the localization device relative to the receiving device.

In an embodiment, determining the position of the localization device includes comparing the geolocation of the localization device to the distance between the localization device and the receiving device, and determining whether the geolocation aligns with the distance.

In an embodiment, the position of the localization device is confirmed upon determining that the geolocation aligns with the distance.

In an embodiment, performing the TDOA includes receiving, by the localization device from the anchors, geolocation data, determining, by the localization device, the geolocation of the localization device using the geolocation data, and transmitting, by the localization device to the receiving device, the geolocation of the localization device.

In an embodiment, the localization device receives the geolocation data via at least one of an Industrial Ethernet (IE) field and a backend link.

In an embodiment, performing the TWR includes exchanging timing data between the localization device and the receiving device, and determining, using the timing data, the distance between the localization device and the receiving device.

In an embodiment, the TWR is at least one of double-sided (DS) TWR (DS-TWR) and single-sided (SS) TWR (SS-TWR), and the TDOA is at least one of up-link (UL) TDOA and down-link (DL) TDOA.

In an embodiment, the localization device performs the TWR in accordance with at least one of an Ultra-Wideband (UWB) wireless protocol and a non-UWB wireless protocol, and the TDOA in accordance with the UWB wireless protocol.

In an embodiment, at least one of the localization device and the receiving device determines the distance between the localization device and the receiving device.

In an embodiment, the localization device is at least one of a mobile device, a tag, and a smartwatch.

In an embodiment, the receiving device is an access gate.

A system for wireless localization is also disclosed. In an embodiment, the system includes anchors configured to provide geolocation data, a localization device configured to perform TWR and TDOA in parallel, and transmit a geolocation of the localization device, and a receiving device configured to perform the TWR with the localization device to determine a distance between the localization device and the receiving device, receive the geolocation of the localization device, and determine, using the distance and the geolocation, a position of the localization device relative to the receiving device.

In an embodiment, determination of the position includes comparison of the geolocation to the distance, and determination of whether the geolocation aligns with the distance.

In an embodiment, the position of the localization device is confirmed upon determination that the geolocation aligns with the distance.

In an embodiment, performance of the TDOA includes reception of the geolocation data from the anchors, and determination of the geolocation using the geolocation data.

In an embodiment, the localization device receives the geolocation data via at least one of an IE field and a backend link.

In an embodiment, the TWR is at least one of DS-TWR and SS-TWR, and the TDOA is at least one of UL TDOA and DL TDOA.

In an embodiment, the TWR is performed in accordance with at least one of an UWB wireless protocol and a non-UWB wireless protocol, and the TDOA is performed in accordance with the UWB wireless protocol.

In an embodiment, at least one of the localization device and the receiving device determines the distance between the localization device and the receiving device using timing data.

A device for wireless localization is also disclosed. In an embodiment, the device includes a radio configured to perform TWR and TDOA in parallel, where the TWR is performed with a receiving device, and the TDOA is performed with anchors to determine a geolocation of the device, and transmit the geolocation to determine a position of the device relative to the receiving device.

Other aspects in accordance with the invention will become apparent from the following detailed description, taken in conjunction with the accompanying drawings, illustrated by way of example of the principles of the invention.

DETAILED DESCRIPTION

Figure 1:
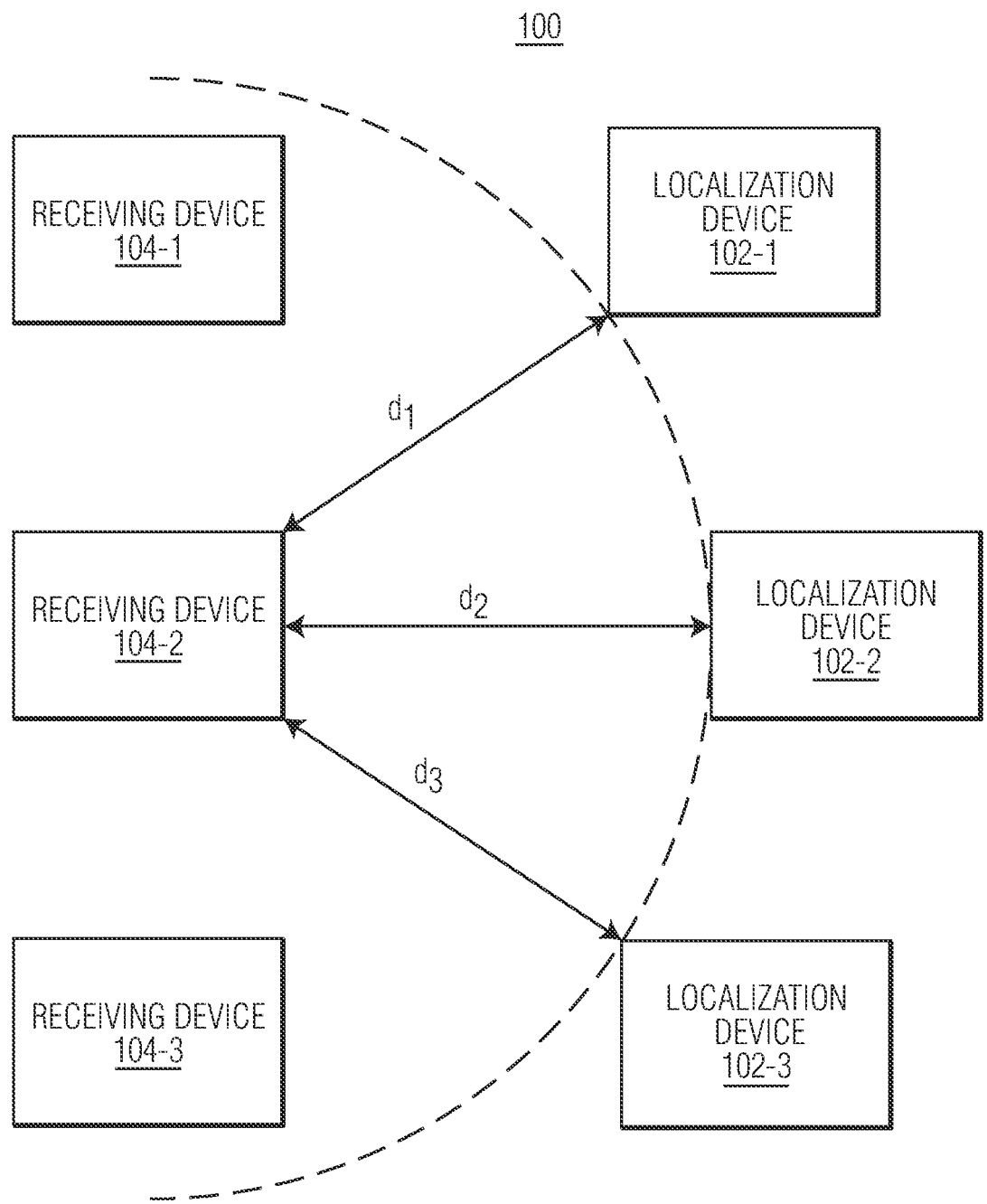
FIG. 1 depicts an example of an environment that includes multiple receiving devices and multiple localization devices.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Devices and systems often use wireless localization for various operations involving tracking, security, and/or financial transactions. For example, a receiving device (e.g., a gate, a door, a lock, a vehicle, a mobile phone, a public transport access gate, a payment terminal, a cashier desk, a payment reader, etc.) may use wireless localization to determine a position of a localization device (e.g., a mobile phone, a tag, a smartwatch, etc.). The position of the localization device may then be used by the receiving device in subsequent operations. Such operations may include, for example, determining whether to unlock a door, grant access to operate an electronic device, or perform a financial transaction.

In conventional wireless localization, Two-Way Ranging (TWR) (e.g., double-sided (DS) TWR (DS-TWR) or single-sided (SS) TWR (SS-TWR)) may be implemented to determine a distance between a localization device and a receiving device. The distance determined via the TWR can then be used to determine a position of the localization device relative to the receiving device in an environment. An example of an environment that includes multiple receiving devices and multiple localization devices is described in further detail with reference to FIG. 1.

FIG. 1 depicts an example of an environment, 100, that includes multiple receiving devices and multiple localization devices. The environment 100 includes three receiving devices, implemented as a first receiving device 104-1, a second receiving device 104-2, and a third receiving device 104-3, and three localization devices, implemented as a first localization device 102-1, a second localization device 102-2, and a third localization device 102-3.

Although the environment of FIG. 1 is shown as including three receiving devices and three localization devices, there may be any number of receiving devices or localization devices located in the environment. Additionally, although the devices (e.g., receiving devices and localization devices) are positioned in certain locations, the locations of the devices are not limited to the locations shown in FIG. 1. Localization devices may also move around as a user of a localization device moves around, e.g., as the user moves around a public transportation area, ticketing area, or checkout counter.

In the embodiment of FIG. 1, the second receiving device 104-2 may be an access gate that controls the opening and closing of a gate. As such, wireless localization may be used by the second receiving device to determine which localization device is most likely to interact with the access gate. In an embodiment, the second receiving device may perform TWR with each localization device to determine a distance between the second receiving device and each of the localization devices.

When the second receiving device 104-2 performs the TWR with each localization device, the second receiving device determines a first distance ($d_1$) between the first localization device 102-1 and the second receiving device, a second distance ($d_2$) between the second localization device 102-2 and the second receiving device, and a third distance ($d_3$) between the third localization device 102-3 and the second receiving device. In an embodiment, $d_1$, $d_2$, and $d_3$ are equal (or within a predetermine range of each other), so the receiving device may not be able to determine which localization device is closest and/or most likely to interact with the access gate.

As such, TWR lacks reliability and operability in environments where multiple localization devices, reflections, and multipath scenarios are present. Examples of such environments include areas that experience frequent congestion (of people, devices, and/or vehicles), such as public transport gates, event entry gates, checkout counters, etc. Consequently, systems that use conventional wireless localization techniques may struggle to determine an accurate position of a localization device when multiple localization devices are present in an environment.

In accordance with an embodiment of the invention, a technique for wireless localization involves performing, by a localization device, TWR and Time Difference of Arrival (TDOA) in parallel, wherein the TWR is performed with a receiving device to determine a distance between the localization device and the receiving device, and the TDOA is performed with anchors to determine a geolocation of the localization device, and determining, using the distance and the geolocation, a position of the localization device relative to the receiving device. As described herein, "in parallel" may be defined as occurring simultaneously or within ±5 seconds (s). Additionally, as described herein, the TWR may be DS-TWR or SS-TWR, and the TDOA may be up-link (UL) TDOA or down-link (DL) TDOA. By performing the TWR and the TDOA in parallel, the wireless localization technique is able to accurately determine the position of the localization device in congested environments. Therefore, combining the TWR and the TDOA improves the efficiency and reliability of wireless localization techniques.

In embodiments described herein, a "localization device" may be a user device such as, for example, a phone, a tag, a smartwatch, a tablet, a laptop etc. In some embodiments, localization devices may communicate with receiving devices and/or anchors via Ultra-Wideband (UWB) communications (e.g., a UWB wireless protocol) and/or via non-UWB communications (e.g., a non-UWB wireless protocol). Examples of non-UWB communications may include, but are not limited to, Long Term Evolution (LTE), Bluetooth Low Energy (BLE), Wi-Fi, cellular, etc. In addition, localization devices may communicate with anchors via an Industrial Ethernet (IE) field or via a backend link.

In embodiments described herein, a "receiving device" may be a device that communicates with localization devices and controls, for example, a gate, a door, a lock, a vehicle, etc. A receiving device may operate independently and may also be included in a control system. When multiple receiving devices are included in a control system, the receiving devices may communicate via a control system network (e.g., a server). In some embodiments, receiving devices may communicate with localization devices via UWB communications and/or non-UWB communications. As an example, a receiving device and a localization device may exchange timing data which may further be used to determine a distance between the localization device and the receiving device. As described herein, a "distance" may be defined as an amount of space between two devices (e.g., the localization device and the receiving device).

In embodiments described herein, an "anchor" may be a beacon, a node, a marker, etc. An anchor may be a unidirectional communication device or a bidirectional communication device. In some embodiments, an anchor communicates with localization devices via UWB communications and/or non-UWB communications. Multiple anchors may be connected via an anchor network (e.g., ethernet, Wi-Fi, and/or UWB) to enable anchor synchronization. Anchor synchronization allows the anchors to transmit time-specific geolocation data to localization devices which may further be used to determine an accurate, real-time geolocation of the localization device. As described herein, a "geolocation" may be defined as a geographic location of a device (e.g., the localization device).

An example of a system that includes a localization device, a receiving device, and anchors is described in further detail with reference to FIG. 2.

Figure 2:
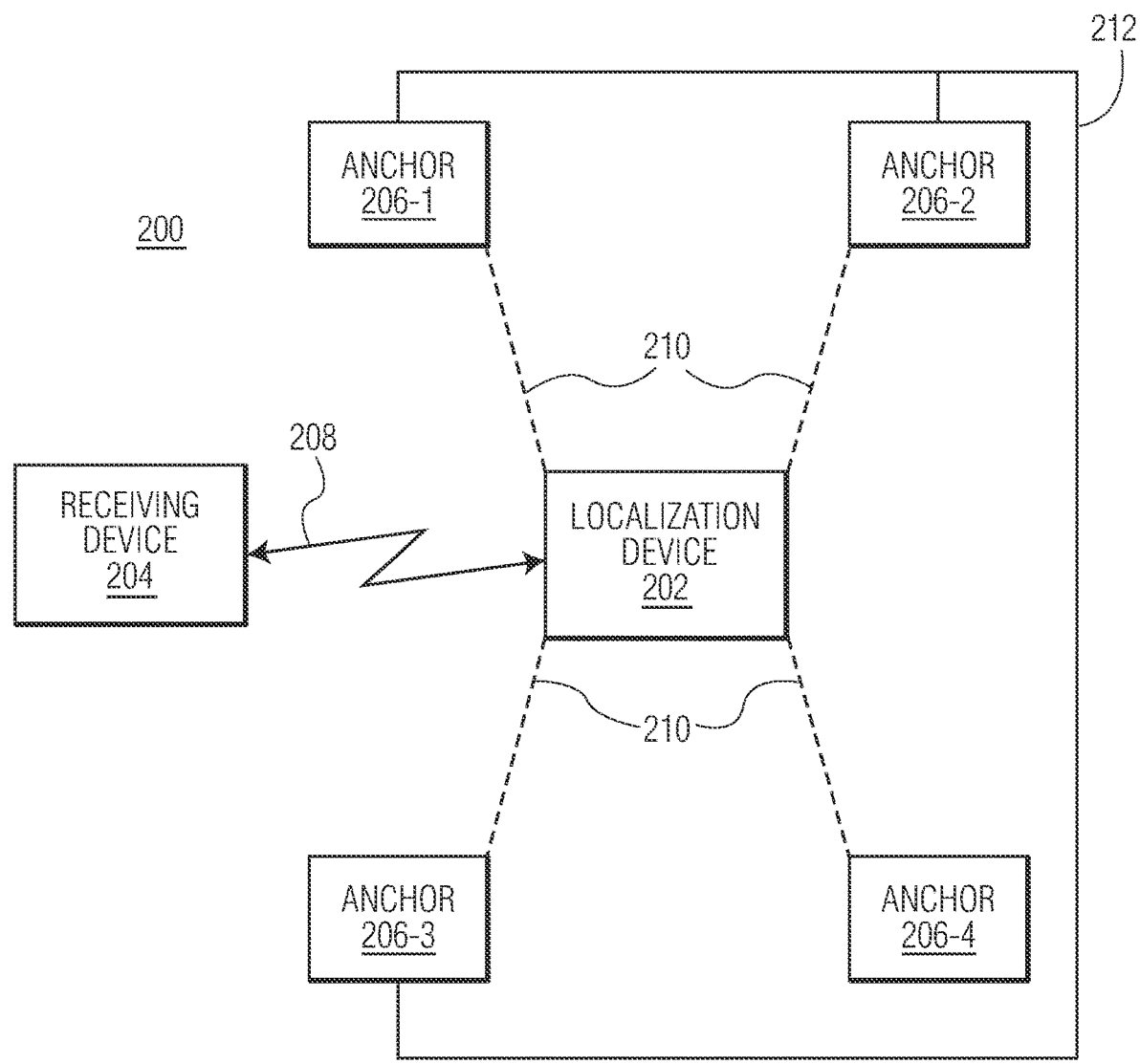
FIG. 2 depicts an example of a system used for wireless localization.

FIG. 2 depicts an example of a system, 200, used for wireless localization. In the embodiment depicted in FIG. 2, the system 200 includes a localization device 202 that wirelessly communicates with a receiving device 204 and four anchors implemented as anchors 206-1, 206-2, 206-3, and 206-4. The system can be used in various applications, such as industrial applications, commercial applications, computer applications, and/or consumer or enterprise applications. In some embodiments, the system is a wireless localization system that is compatible with an Institute of Electrical and Electronics Engineers (IEEE) protocol. Although the system 200 is shown in FIG. 2 with certain components and described with certain functionality herein, other embodiments of the system may include fewer or more components to implement the same, less, or more functionality. Additionally, although the system is shown in FIG. 2 as being connected in a certain topology, the network topology of the system is not limited to the topology shown in FIG. 2.

In an embodiment, the localization device 202 may be a user device. The localization device 202 may include a radio (e.g., a UWB radio and/or a non-UWB radio) that may be implemented in hardware (e.g., circuits), software, firmware, or a combination thereof. The radio of the localization device 202 may be fully or partially implemented as an integrated circuit (IC) device. In some embodiments, the radio may be compatible with at least one wireless protocol. In some embodiments, the radio wirelessly connects to the receiving device 204 and the anchors 206-1, 206-2, 206-3, and 206-4, for example, through one or more wireless protocols (e.g., an IEEE 802.15.4 protocol, Wi-Fi, BLE, Thread, etc.).

In some embodiments, the radio of the localization device 202 includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets (e.g., blink packets) through the at least one antenna. In some embodiments, the at least one controller is implemented within a processor, such as a microcontroller (MCU), a host processor, a host, a digital signal processor (DSP), or a central processing unit (CPU), which can be integrated in a corresponding transceiver.

In an embodiment, the receiving device 204 can associate with (e.g., connect to) the localization device 202 and communicate with the localization device via a wireless medium 208 (e.g., via UWB communications and/or non-UWB communications). The receiving device 204 may include a radio that functions and has similar components to the radio of the localization device 202. Although the system 200 is shown in FIG. 2 as including one receiving device, other embodiments of the system may include more than one receiving device.

The receiving device 204 may be configured to perform TWR with the localization device using known techniques. For example, the receiving device may be connected (e.g., wirelessly connected) to the radio of the localization device, such that the receiving may exchange timing data with the localization device.

In an embodiment, the anchors 206-1, 206-2, 206-3, and 206-4 can associate with (e.g., connect to) the localization device 202 and communicate with the localization device via a wireless medium (shown by dashed lines 210) (e.g., via UWB communications and/or non-UWB communications). The anchors may each be connected via a network 212. The network 212 may involve each of the anchors in the system 200 being connected through, for example, ethernet and/or Wi-Fi to enable anchor synchronization. Although the system 200 is shown in FIG. 2 as including four anchors, other embodiments of the system may include three anchors or more than four anchors.

The anchors 206-1, 206-2, 206-3, and 206-4 may each be configured to perform TDOA with the localization device using known techniques. For example, the anchors may be connected (e.g., wirelessly connected) to the radio of the localization device, such that the radio may obtain geolocation data transmitted by each of the anchors. In such an example, each of the anchors may transmit the geolocation data via a blink packet that includes information corresponding to the respective anchor.

In an embodiment, for a system to perform wireless localization using TWR and TDOA, a localization device, a receiving device, and anchors may each need to communicate to determine a position of the localization device. An example of communications between a localization device, a receiving device, and anchors is described in further detail with reference to FIG. 3.

Figure 3:
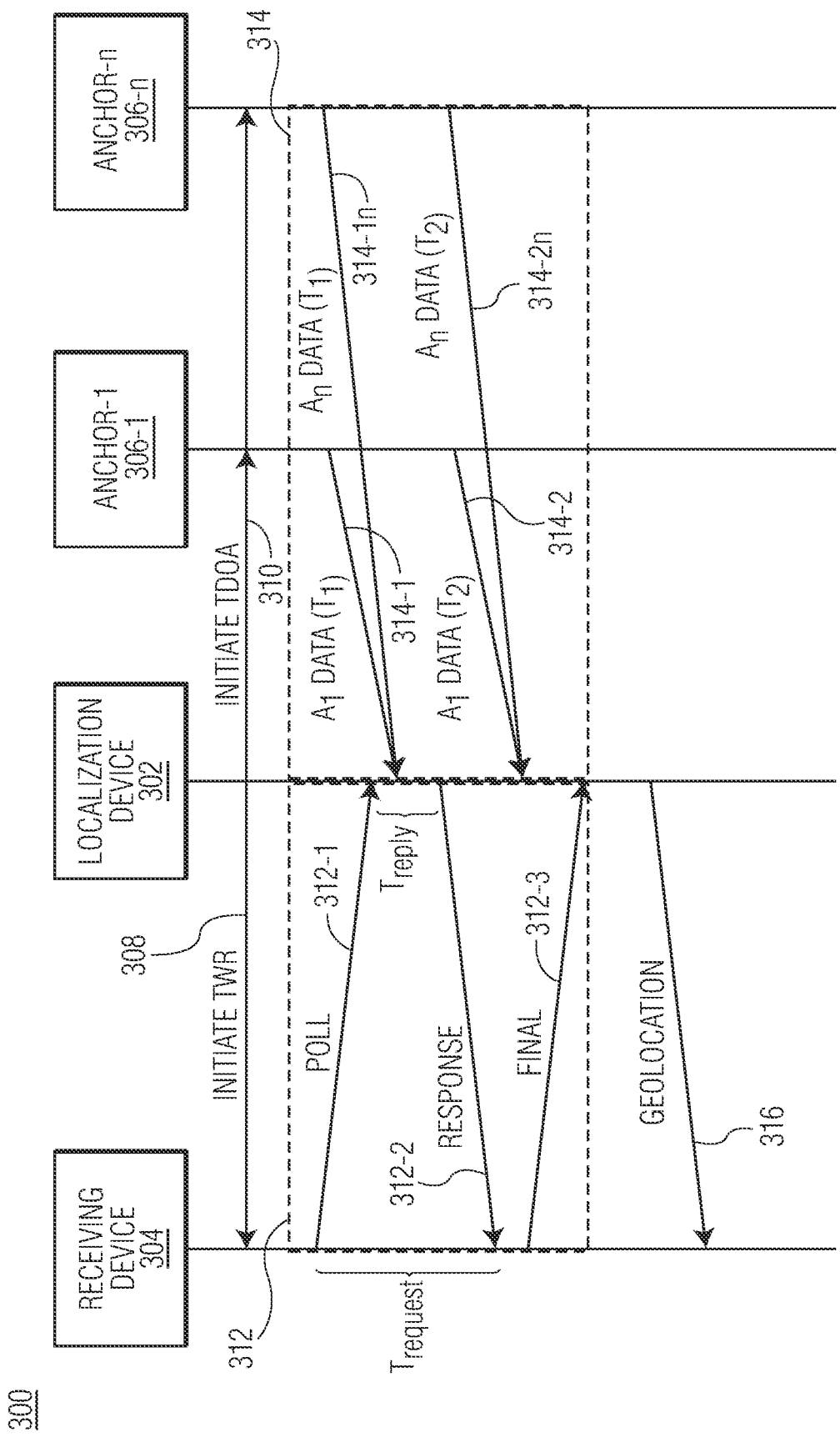
FIG. 3 depicts an example of communications in a system used for wireless localization.

FIG. 3 depicts an example of communications in a system, 300, used for wireless localization. The system 300 includes a receiving device 304, a localization device 302, and anchors, implemented as anchor-1 306-1 and anchor-n 306-n (n may be an integer greater than two), that are each as described with reference to FIG. 2. In the embodiment of FIG. 3, the system communicates to determine a position of the localization device relative to the receiving device.

To determine the position of the localization device 302, the localization device initiates TWR with the receiving device 304 and TDOA with the anchors 306-1 and 306-n. The TWR may be performed in accordance with a UWB wireless protocol or a non-UWB wireless protocol, and the TDOA may be performed in accordance with the UWB wireless protocol.

The localization device 302 may initiate the TWR by transmitting to the receiving device 304, an indication to initiate the TWR 308 (shown by "initiate TWR"). In addition, the localization device may initiate the TDOA by transmitting to the anchors 306-1 and 306-n, an indication to initiate the TDOA 310 (shown by "initiate TDOA"). After the receiving device and the anchors receive the indications to initiate the TWR and the TDOA, the localization device performs, in parallel, the TWR (shown by dashed box 312) with the receiving device, and the TDOA (shown by dashed box 314) with the anchors.

The localization device 302 performs the TWR (shown by dashed box 312) with the receiving device 304 to determine a distance between the localization device and the receiving device. In an embodiment, performing the TWR includes exchanging timing data between the localization device and the receiving device, and determining, using the timing data, the distance between the localization device and the receiving device.

As an example, exchanging the timing data includes the receiving device 304 transmitting a poll message 312-1 (shown by "poll") to the localization device 302, and the localization transmitting a response message 312-2 (shown by "response") to the receiving device. An amount of time between when the poll message is sent by the receiving device, and when the response message is received by the receiving device is represented by "$T_{request}$". An amount of time between when the poll message is received by the localization device, and when the response message is transmitted by the localization device is represented by "$T_{reply}$". In such an example, determining the distance between the localization device and the receiving device includes comparing $T_{request}$ to $T_{reply}$ using a Time-of-Flight principle. In the embodiment shown by FIG. 3, the receiving device determines the distance, and transmits the distance via a final message 312-3 (shown by "final") to the localization device.

The localization device 302 performs the TDOA (shown by dashed box 314) with the anchors 306-1 and 306-n to determine a geolocation of the localization device. In an embodiment, performing the TDOA includes the localization device receiving geolocation data from the anchors (e.g., via an IE field or a backend link) and determining the geolocation of the localization device using the geolocation data. In such an embodiment, anchors may transmit corresponding geolocation data to the localization device at various time intervals (e.g., once every second, once every two seconds, etc.).

As an example, anchor-1 306-1 transmits its corresponding geolocation data at a first time 314-1 (shown by "$A_1$ Data $(T_1)$"), and anchor-n 306-n transmits its corresponding geolocation data at the first time 314-1n (shown by "$A_n$ Data $(T_1)$") to the localization device 302. In such an example, anchor-1 306-1 also transmits its corresponding geolocation data at a second time 314-2 (shown by "$A_1$ Data $(T_2)$") and anchor-n 306-n transmits its corresponding geolocation data at the second time 314-2n (shown by "An Data $(T_2)$"). Although each anchors is shown as transmitting the geolocation data to the localization device twice, each anchor may transmit the geolocation data less than twice or more than twice.

In an embodiment, the geolocation data includes information corresponding to the geolocation of the localization device 302 relative to the anchors 306-1 and 306-n at a respective time. In such an embodiment, the localization device determines the geolocation of the localization device using the geolocation data. For example, the localization device may be configured to process the geolocation data received from the anchors to determine the geolocation. After determining the geolocation, the localization device transmits the geolocation 316 (shown by "geolocation") to the receiving device 304.

Although not shown, the receiving device 304 may then use the distance and the geolocation to determine the position of the localization device 302 relative to the receiving device. In an embodiment, determining the position of the localization device includes comparing the geolocation of the localization device to the distance between the localization device and the receiving device, and determining whether the geolocation aligns (e.g., matches, conforms, etc.) with the distance. In such an embodiment, the position of the localization device is confirmed upon determining that the geolocation aligns with the distance. As described herein, a geolocation that "aligns" with a distance may be defined as having the same distances or distances that are within a predetermined range of, e.g., ±0.25 meters (m).

As an example, if the receiving determines that the distance between the localization device and the receiving device is 10 m, and determines, using the geolocation, that the localization device is 10 m from the receiving device, then the geolocation aligns with the distance and the position of the localization device is confirmed. As another example, if the receiving determines that the distance between the localization device and the receiving device is 10 m, and determines, using the geolocation, that the localization device is 15 m from the receiving device, then the geolocation does not align with the distance and the position of the localization device is not confirmed.

In an embodiment, during communications in a system, a localization device, a receiving device, and anchors may each perform operations corresponding to wireless localization. Examples of localization device operations, receiving device operations, and anchor operations during wireless localization are described in further detail with reference to FIG. 4, FIG. 5, and FIG. 6, respectively.

Figure 4:
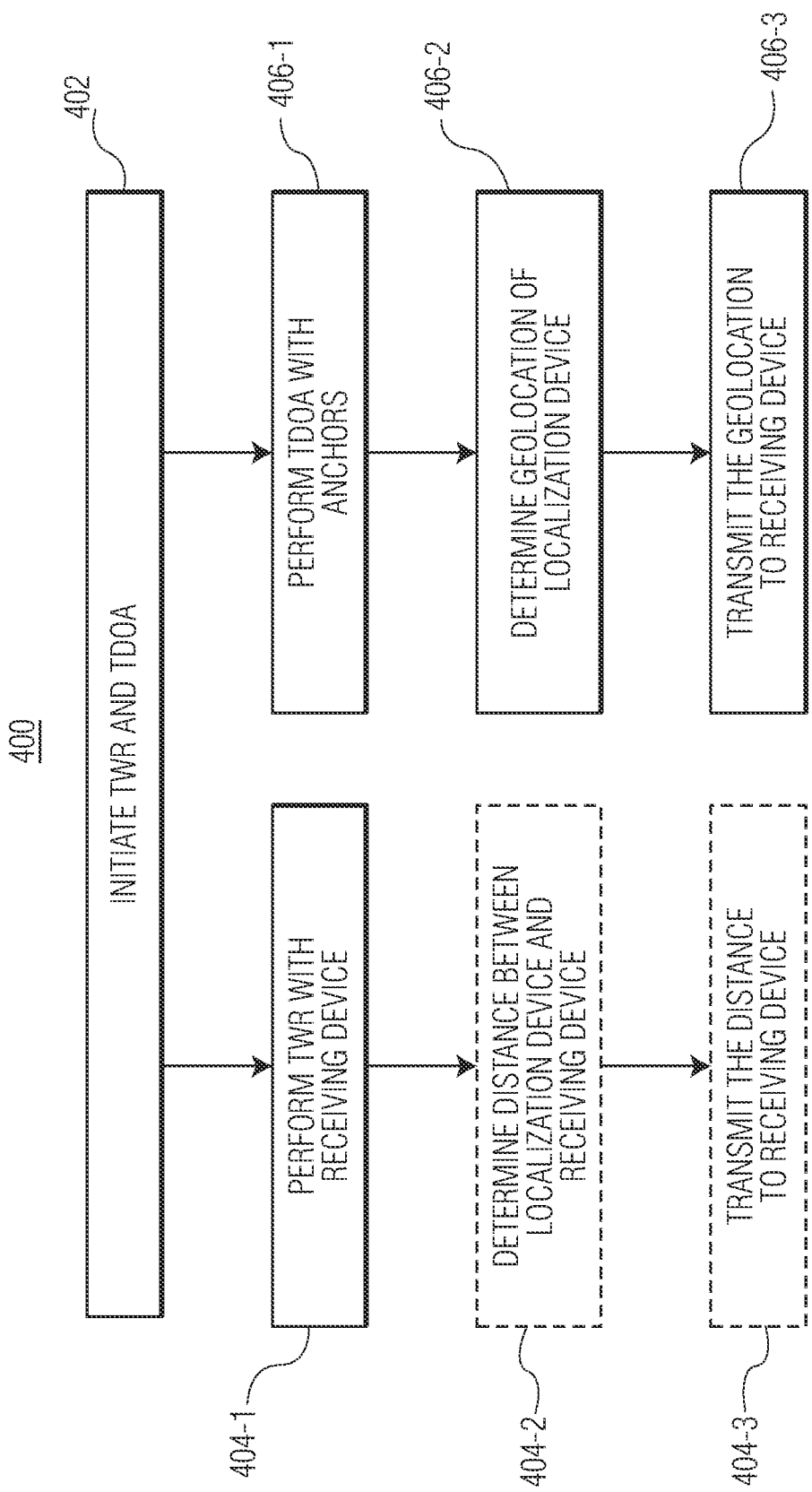
FIG. 4 is a process flow diagram of localization device operations during wireless localization.

FIG. 4 is a process flow diagram of localization device operations 400 during wireless localization. In an embodiment, the localization device operations 400 may be implemented by a localization device (not shown) when communicating with a receiving device (not shown) and anchors (not shown) as described with reference to FIG. 3.

At block 402, the localization device initiates TWR and TDOA, such that an indication to initiate the TWR is transmitted to the receiving device and another indication to initiate the TDOA is transmitted to the anchors. As an example, the indications to initiate the TWR and the TDOA may be transmitted within, e.g., 500 milliseconds (ms) of each other. After the TWR and the TDOA have been initiated, the localization device may perform the TWR and the TDOA in parallel (e.g., simultaneously) at blocks 404-1 and 406-1, respectively. At block 404-1, the TWR is performed with the receiving device to determine a distance between the localization device and the receiving device. At block 406-1, the TDOA is performed with anchors to determine a geolocation of the localization device. After performing the TDOA with the anchors, the localization device determines the geolocation of the localization device at block 406-2, and transmits the geolocation to the receiving device at block 406-3.

In one embodiment, if the receiving device does not determine the distance between the localization device, and/or the localization device does not receive the distance from the receiving device, then the localization device determines the distance. As an example, after performing the TWR with the receiving device at block 404-1, the localization device determines the distance between the localization device and the receiving device at dashed block 404-2. In such an example, after determining the distance between the localization device and the receiving device, the localization device transmits the distance to the receiving device at dashed block 404-3.

In another embodiment, if the receiving device determines the distance between the localization device, and/or the localization devices receives the distance from the receiving device, then the localization device does not determine the distance. In such an embodiment, because the localization device does not determine the distance, the localization devices does not perform the operations at dashed blocks 404-2 and 404-3.

Figure 5:
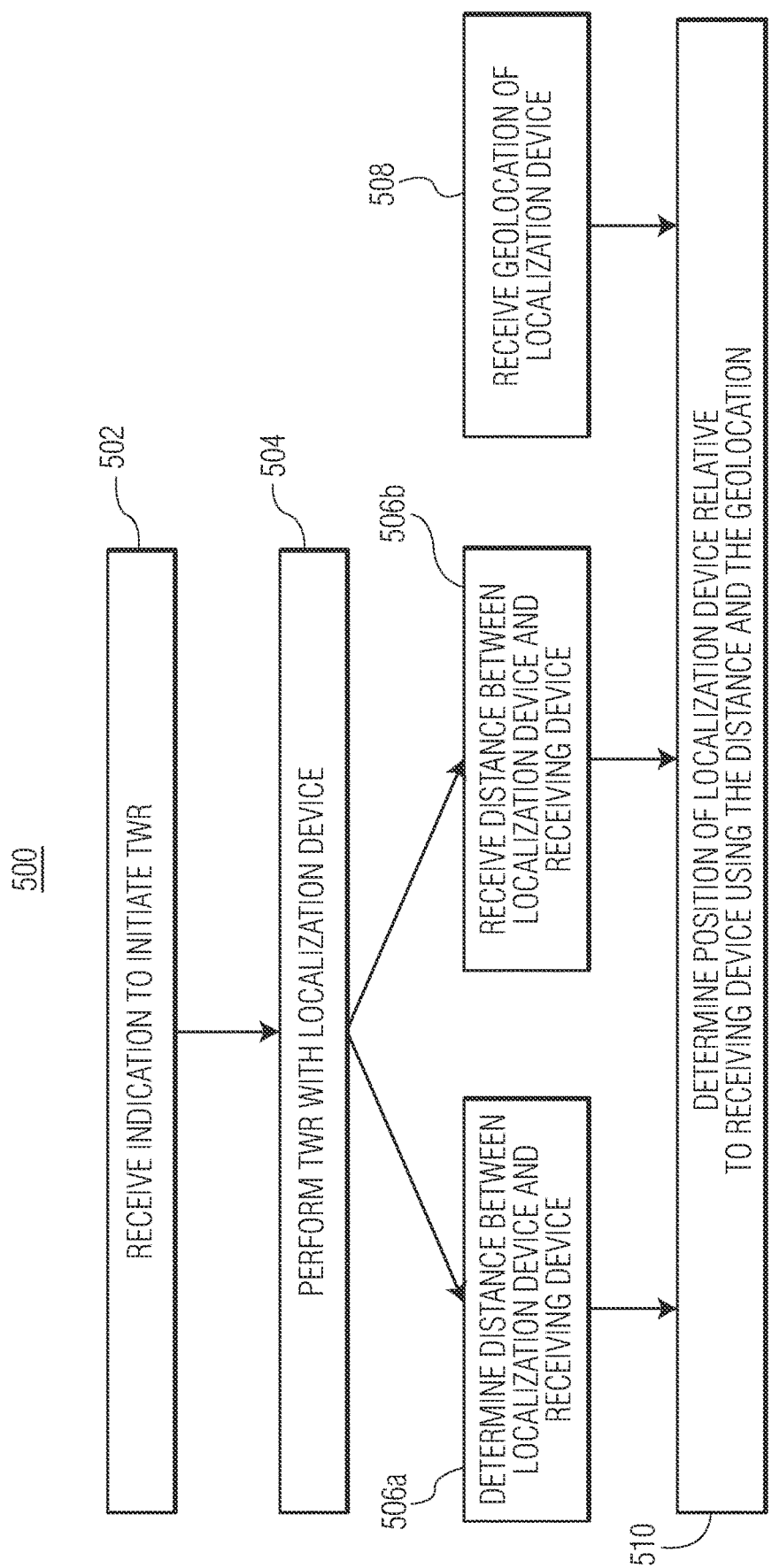
FIG. 5 is a process flow diagram of receiving device operations during wireless localization.

FIG. 5 is a process flow diagram of receiving device operations 500 during wireless localization. In an embodiment, the receiving device operations 500 may be implemented by a receiving device (not shown) when communicating with a localization device (not shown) as described with reference to FIG. 3.

At block 502, the receiving device receives an indication to initiate TWR. As an example, the indication is received from the localization device and indicates for the receiving device to initiate TWR with the localization device. After receiving the indication to initiate the TWR, the receiving device performs the TWR with the localization device at block 504.

After performing the TWR with the localization device, the receiving device or the localization device may determine a distance between the devices. In one embodiment, the receiving device determines the distance between the localization device and the receiving device at block 506a. In another embodiment, the localization device determines the distance between the localization device and the receiving device, and the receiving device receives the distance from the localization device at block 506b.

Additionally, the receiving device receives a geolocation of the localization device at block 508. The geolocation may be received by the receiving device from the localization device after the localization device performs the TDOA (and the TWR). After the receiving device has received the geolocation at block 508, and determined the distance at block 506a or received the distance at block 506b, the receiving device determines a position of the localization device relative to the receiving device using the distance and the geolocation at block 510.

Figure 6:
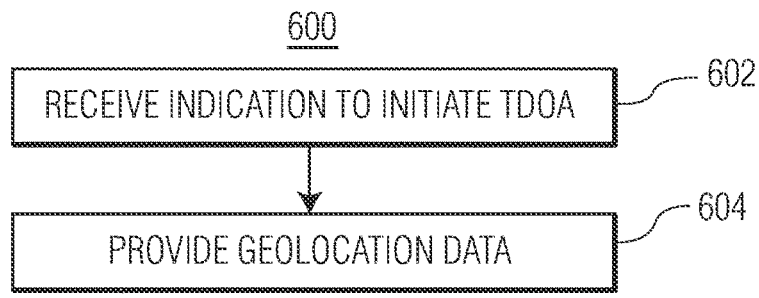
FIG. 6 is a process flow diagram of anchor operations during wireless localization.

FIG. 6 is a process flow diagram of anchor operations 600 during wireless localization. In an embodiment, the anchor operations 600 may be implemented by an anchor (not shown) when communicating with a localization device (not shown) as described with reference to FIG. 3. At block 602, the anchor receives an indication to initiate TDOA with the localization device. After receiving the indication to initiate the TDOA, the anchor provides (e.g., transmits) geolocation data to the localization device at block 604.

Figure 7:
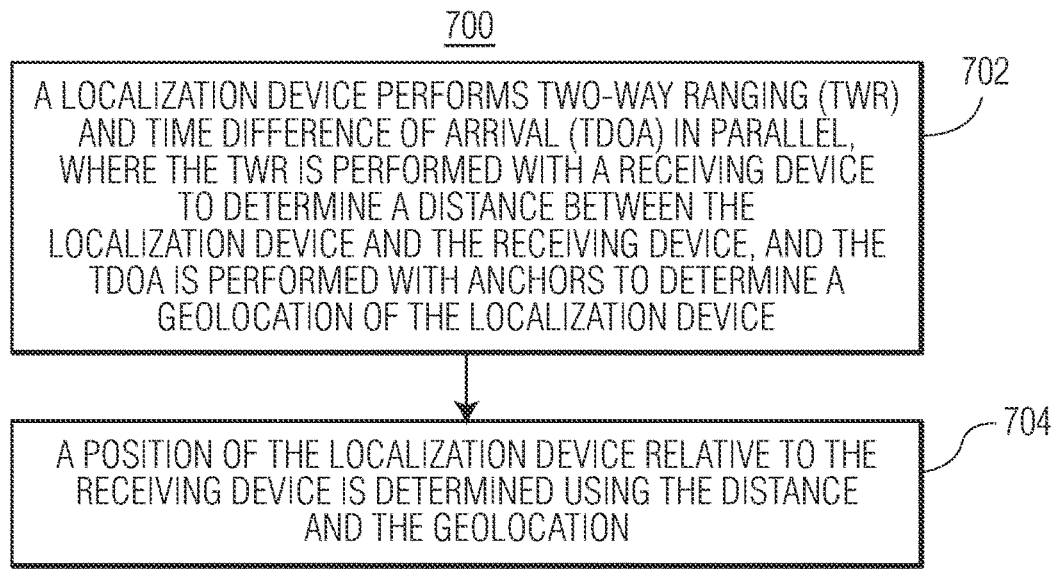
FIG. 7 illustrates a flow diagram of a technique for wireless localization in accordance with an embodiment of the invention.

FIG. 7 illustrates a flow diagram of a technique for wireless localization in accordance with an embodiment of the invention. At block 702, a localization device performs TWR and TDOA in parallel, where the TWR is performed with a receiving device to determine a distance between the localization device and the receiving device, and the TDOA is performed with anchors to determine a geolocation of the localization device. At block 704, a position of the localization device relative to the receiving device is determined using the distance and the geolocation.

In some embodiments, the technique for wireless localization may be implemented by a system. For example, a system may include anchors configured to provide geolocation data, a localization device configured to perform TWR and TDOA in parallel, and transmit a geolocation of the localization device, and a receiving device configured to perform the TWR with the localization device to determine a distance between the localization device and the receiving device, receive the geolocation of the localization device, and determine, using the distance and the geolocation, a position of the localization device relative to the receiving device.

In some embodiments, the technique for wireless localization may be implemented by a device (e.g., a localization device). For example, a device may include a radio configured to perform TWR and TDOA in parallel, where the TWR is performed with a receiving device, and the TDOA is performed with anchors to determine a geolocation of the device, and transmit the geolocation to determine a position of the device relative to the receiving device.

Figure 8:
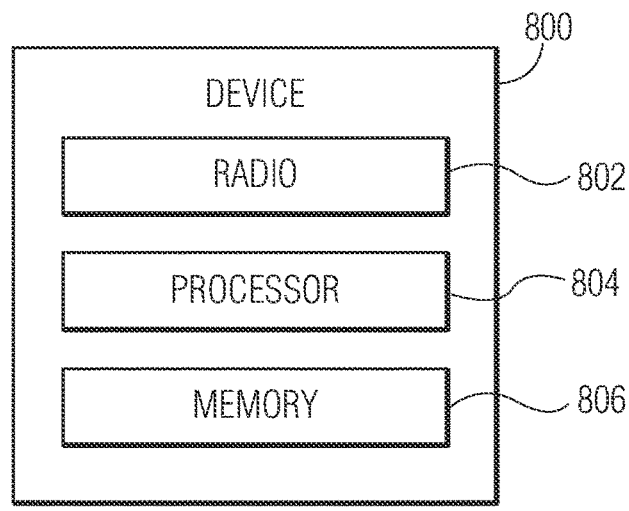
FIG. 8 depicts an example of a device that may be used for wireless localization in accordance with an embodiment.

In an embodiment, the above-described functionality is performed at least in part by a device (e.g., computer or computers), which executes computer readable instructions. FIG. 8 depicts an example of a device 800 that can implement the technique for wireless localization as described with reference to FIG. 7. As shown, the device 800 includes a radio 802, a processor 804, and a memory 806.

The processor may include a multifunction processor and/or an application-specific processor. The memory within the device may include, for example, a storage medium such as read only memory (ROM), flash memory, random-access memory (RAM), and a large capacity permanent storage device such as a hard disk drive. The radio enables communications with other devices. For example, the radio may include a Radio Frequency (RF) front-end antenna, such that the radio may communicate with devices (e.g., receiving devices, localization devices, and/or anchors) using a wireless protocol. In some embodiments, there may be more than one radio, such that the device 800 may include a UWB radio, a non-UWB radio, or a combination thereof. The device executes computer readable instructions stored in the storage medium to implement various tasks as described above.

Furthermore, the device 800 can include a computing system (not shown) that features multiple components that may be used for wireless localization services.

The device 800 may represent, e.g., the localization devices and/or the receiving devices as described with reference to FIGS. 2-5. In some embodiments, the device 800 may be integrated with consumer electronic devices (e.g., mobile phones, laptops, smartwatches, wearable tags, etc.) and/or with industrial electronic devices (e.g., gates, doors, vehicles, etc.). For example, the device may be embedded into mobile phones and/or gates to assist with wireless localization services.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc. Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for wireless localization, the method comprising:
    performing, by a localization device, Two-Way Ranging (TWR) and Time Difference of Arrival (TDOA) in parallel, wherein:
        the TWR is performed with a receiving device to determine a distance between the localization device and the receiving device; and
        the TDOA is performed with anchors to determine a geolocation of the localization device; and
    determining, using the distance and the geolocation, a position of the localization device relative to the receiving device.

2. The method of claim 1, wherein determining the position of the localization device includes:
    comparing the geolocation of the localization device to the distance between the localization device and the receiving device; and
    determining whether the geolocation aligns with the distance.

3. The method of claim 2, wherein the position of the localization device is confirmed upon determining that the geolocation aligns with the distance.

4. The method of claim 1, wherein performing the TDOA includes:
    receiving, by the localization device from the anchors, geolocation data;
    determining, by the localization device, the geolocation of the localization device using the geolocation data; and
    transmitting, by the localization device to the receiving device, the geolocation of the localization device.

5. The method of claim 4, wherein the localization device receives the geolocation data via at least one of an Industrial Ethernet (IE) field and a backend link.

6. The method of claim 1, wherein performing the TWR includes:
    exchanging timing data between the localization device and the receiving device; and
    determining, using the timing data, the distance between the localization device and the receiving device.

7. The method of claim 1, wherein;
    the TWR is at least one of double-sided (DS) TWR (DS-TWR) and single-sided (SS) TWR (SS-TWR); and
    the TDOA is at least one of up-link (UL) TDOA and down-link (DL) TDOA.

8. The method of claim 1, wherein the localization device performs:
    the TWR in accordance with at least one of an Ultra-Wideband (UWB) wireless protocol and a non-UWB wireless protocol; and
    the TDOA in accordance with the UWB wireless protocol.

9. The method of claim 1, wherein at least one of the localization device and the receiving device determines the distance between the localization device and the receiving device.

10. The method of claim 1, wherein the localization device is at least one of a mobile device, a tag, and a smartwatch.

11. The method of claim 1, wherein the receiving device is an access gate.

12. A system comprising:
    anchors configured to provide geolocation data;
    a localization device configured to:
        perform Two-Way Ranging (TWR) and Time Difference of Arrival (TDOA) in parallel; and
        transmit a geolocation of the localization device; and
    a receiving device configured to:
        perform the TWR with the localization device to determine a distance between the localization device and the receiving device;
        receive the geolocation of the localization device; and
        determine, using the distance and the geolocation, a position of the localization device relative to the receiving device.

13. The system of claim 12, wherein determination of the position includes:
    comparison of the geolocation to the distance; and
    determination of whether the geolocation aligns with the distance.

14. The system of claim 13, wherein the position of the localization device is confirmed upon determination that the geolocation aligns with the distance.

15. The system of claim 12, wherein performance of the TDOA includes:

reception of the geolocation data from the anchors; and
determination of the geolocation using the geolocation data.

16. The system of claim 15, wherein the localization device receives the geolocation data via at least one of an Industrial Ethernet (IE) field and a backend link.

17. The system of claim 12, wherein;
the TWR is at least one of double-sided (DS) TWR (DS-TWR) and single-sided (SS) TWR (SS-TWR); and
the TDOA is at least one of up-link (UL) TDOA and down-link (DL) TDOA.

18. The system of claim 12, wherein;
the TWR is performed in accordance with at least one of an Ultra-Wideband (UWB) wireless protocol and a non-UWB wireless protocol; and
the TDOA is performed in accordance with the UWB wireless protocol.

19. The system of claim 12, wherein at least one of the localization device and the receiving device determines the distance between the localization device and the receiving device using timing data.

20. A device comprising:
a radio configured to:
perform Two-Way Ranging (TWR) and Time Difference of Arrival (TDOA) in parallel, wherein:
the TWR is performed with a receiving device; and
the TDOA is performed with anchors to determine a geolocation of the device; and
transmit the geolocation to determine a position of the device relative to the receiving device.

* * * * *